United States Patent [19]

Tye

[11] 3,841,244
[45] Oct. 15, 1974

[54] PLANTING IMPLEMENT, DRAG

[76] Inventor: John M. Tye, P.O. Address Box 218, Lockney, Tex. 79241

[22] Filed: Mar. 7, 1973

[21] Appl. No.: 338,753

[52] U.S. Cl. .................................................. 111/85
[51] Int. Cl. ............................................. A01c 5/06
[58] Field of Search .......... 111/85, 83, 84; 172/611, 172/145

[56] References Cited
UNITED STATES PATENTS

| | | | |
|---|---|---|---|
| 2,155,891 | 4/1939 | Campbell | 111/85 |
| 2,545,747 | 3/1951 | Oswald et al. | 111/85 |
| 2,630,052 | 3/1953 | Jory | 172/611 X |
| 3,023,717 | 3/1962 | Cline | 111/85 X |
| 3,742,877 | 7/1973 | Coffee | 111/85 X |

Primary Examiner—Stephen C. Pellegrino
Attorney, Agent, or Firm—Wendell Coffee

[57] ABSTRACT

A drill type planting implement is used for planting general-purpose agricultural crops. The baisc drill includes elongated seed box with a plurality of seeders feeding seeds through chutes to planter discs. The boxes are mounted on a frame having horizontal elongated beams. A three-point hitch attaches the frame to a draft vehicle. The beams of the frame are forward of the planting discs and form means for attaching pre-plant tilling implements such as bed shapers or elongated rollers. The seeders may be driven from the roller.

A packer wheel behind each planting disc acts as a depth gauge for the planter discs. The packer wheels journal to arms which are pivoted about the same point as other arms attached to the planter disc. A particular J-shaped strap extends from a plate on the packer wheel arm to the planter disc arms.

Press wheels are journaled to arms which pivot from behind the planter discs themselves. A covering drag behind is pivoted to the axle of the press wheel. The covering drags may be weighted by ring-shaped weights placed upon a pintle upon the drags.

1 Claim, 8 Drawing Figures 3,841,244

PATENTED OCT 15 1974　　　3,841,244

PLANTING IMPLEMENT, DRAG

CROSS-REFERENCE TO RELATED APPLICATIONS:

This application is filed concurrently with two additional applications having the same disclosure, but different claims, which pending applications are Ser. Nos. 338,752 and 338,754. The subject matter is similar to my previous patent application entitled *AGRICULTURAL DRILL*, filed Apr. 24, 1972, Ser. No. 247,120, however, no claim for priority is made at this time.

BACKGROUND OF THE INVENTION:

1. Field of the Invention

This invention relates to agriculture and particularly to planting and planters.

2. Description of the Prior Art

It is previously known, and I have previously disclosed in my prior patent application noted above, the desirability of planting row crops with a grain drill.

Also, before this invention, bed shapers have been in common use with row planters, however, to my knowledge they have not been used particularly in combination with the drill-type planter. A wide roller as a preplant tillage implement for seedbed preparation implement is not widely used.

It has been known that packer wheels could be used as depth gauge wheels for planters and furrow-making implements.

Prior to this invention, press wheels and drag-type covers have been known. Previous to this invention, primarily, the drag-type covers were a single U-shaped, rigid piece of metal which were towed behind the planting implement by a chain.

SUMMARY OF THE INVENTION:

New and Different Function.

With my new, improved drill-type planter, I have beams on the frame which are ideally suited for attaching preplant tilling implements. Therefore, I have provided a simple, compact planting implement, which is mounted on a three-point hitch so it is readily attached to the tractor, raised and lowered and which provides both the preplant tilling and seedbed preparation together with the planting operation.

In addition, I have found a better way in which to provide a depth gauge to the planting disc and regulate the relationship between the planting disc and the packer wheel.

Furthermore, I have provided a better arrangement for a press wheel, drag-type covering arrangement.

Objects of This Invention.

An object of this invention is to plant agricultural crops.

Another object is to provide the implements to plant agricultural crops.

Other objects are to prepare the seed bed simultaneously with the planting of the crop.

Further objects are to achieve the above with a device that is sturdy, compact, durable, lightweight, simple, safe, efficient, versatile, and reliable, yet inexpensive and easy to manufacture, attach, adjust, operate, and maintain.

Still further objects are to achieve the above with a method that is versatile, rapid, efficient, and inexpensive, and does not require skilled people to attach, adjust, operate, and maintain.

The specific nature of the invention, as well as other objects, uses, and advantages thereof, will clearly appear from the following description and from the accompanying drawing, the different views of which are not necessarily to the same scale.

Figure 1:
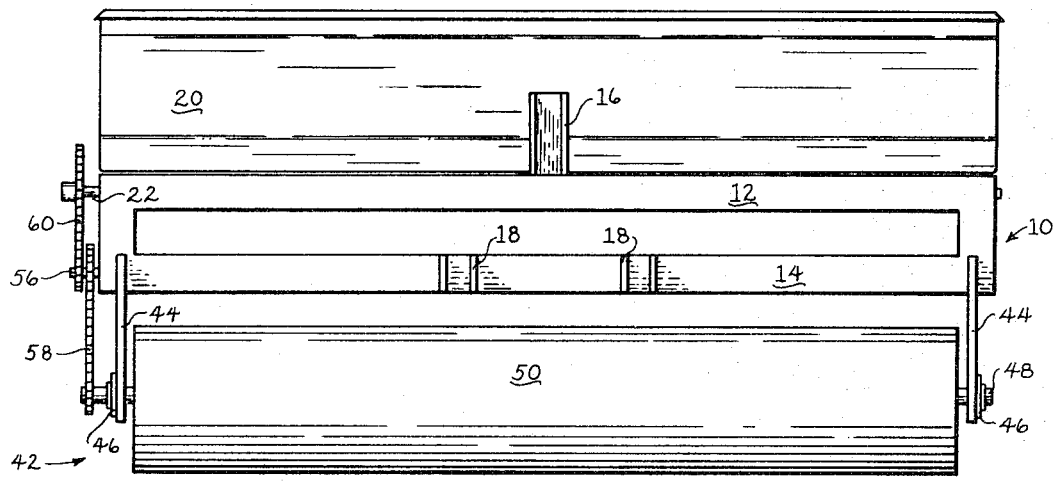
FIG. 1 is a front elevational view of a planter showing the roller preplant tiller. The seed chutes and the planter discs not shown to better illustrate the invention.

DETAILED DESCRIPTION OF THE PREFERRED EMBODIMENTS:

Referring particularly to FIGS. 1 through 4, there is illustrated the basic drill. The drill has as a principal par thereto frame 10. This frame includes as basic elements: a back beam, not shown in the drawings, top beam 12 and bottom beam 14. The bottom and top beams 14 and 12 are horizontal and parallel to one another. The top beam is located vertically above the bottom beam. The beams are normal to the direction of draft. Attachment 16 mounted on the center of the top beam 12 and attachments 18 mounted on the bottom beam 14 form means for attaching the frame to a draft vehicle. Those skilled in the art will recognize the attachments 16 and 18 as the standard three-point hitch found on nearly all farm implements of modern manufacture. These means for attaching the frame to a draft vehicle provide means not only for pulling the vehicle in the direction of draft (shown by arrow D in FIG. 2), but also means for elevating the implement. The frame is produced from hollow, rectangular tubes welded together and, therefore, is essentially a single unit frame.

Elongated seed box 20 is mounted upon the frame 10. In the bottom of the seed box are a plurality of seeders which are driven from common seeder shaft 22. The seed are dropped from the seeders through chutes 24 to each planting disc assembly 26. The planting disc assembly is a planter means for opening a furrow and dropping seed therein. The assembly comprises a pair of planter discs 28 attached to boot and body 30. The boot is attached by planter disc arms 32 to pivot bolts 34 which extend through ears 36 conveniently attached to the bottom beam 14. This specification discloses the ears 36 individually attached as by welding to the bottom of the bottom beam 14. It will be recognized that my previously filed application, identified above, discloses a different means for attaching the planter arm discs to pivot bolts to the bottom beam. However, an examination of the two applications shows the generic arrangement of the planter assembly 26 attached by planter disc arm 32 to pivot bolts 34 which are attached by ears to the bottom beam 14. The seed come from the seeders on the seed box 20 through the chutes 24 to the planter assemblies. Each planter assembly 26 is biased downward by its own weight. Additional downward pressure, if necessary, is provided by spring 38 surrounding rod 40 which extends from the back beam to each of the planter assemblies 26. The spring 38 and rod 40 not only bias the planter assembly 26 down, but also limit its depth.

The machinery and mechanisms described to this point are old, disclosed in my previous application, and well known to the art. Therefore, although great detail has not been given in the description to this point, those skilled in the art will understand how it can be made and operated.

Figure 2:
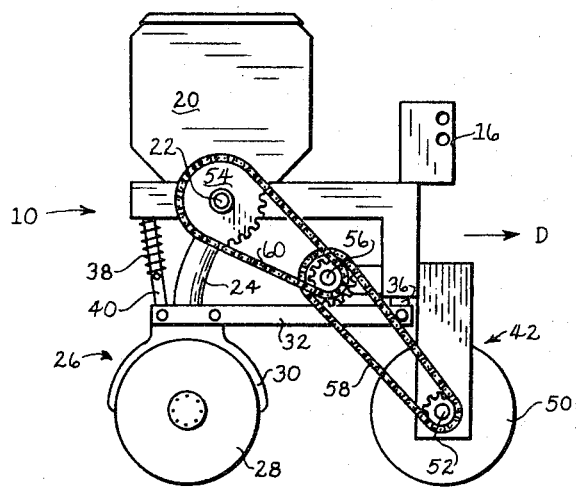
FIG. 2 is a side elevational view of the implement shown in FIG. 1.
Figure 3:
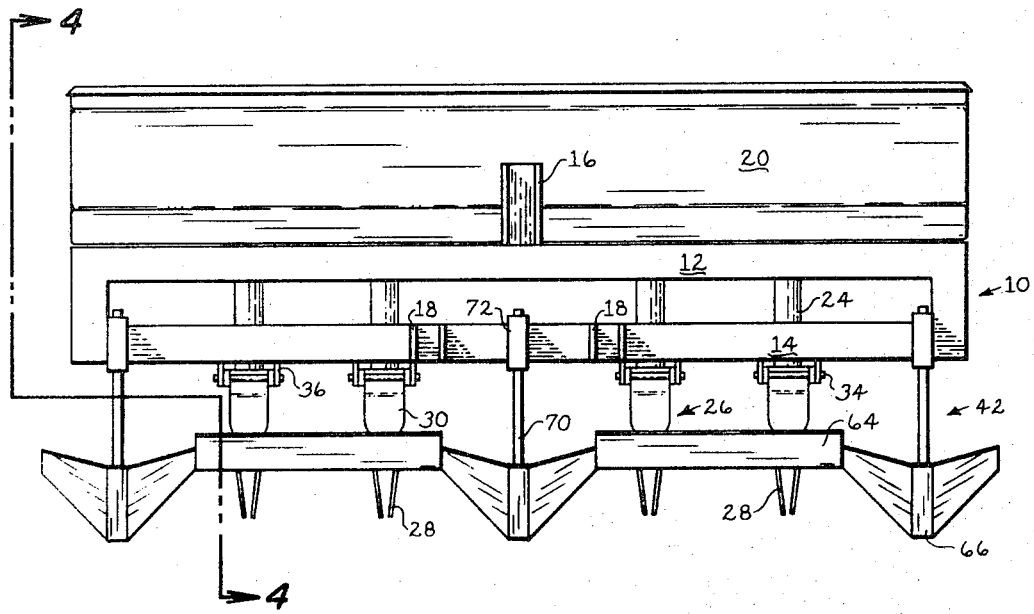
FIG. 3 is a front elevational view of a planter with bed shapers used as the preplant tillage implement.
Figure 4:
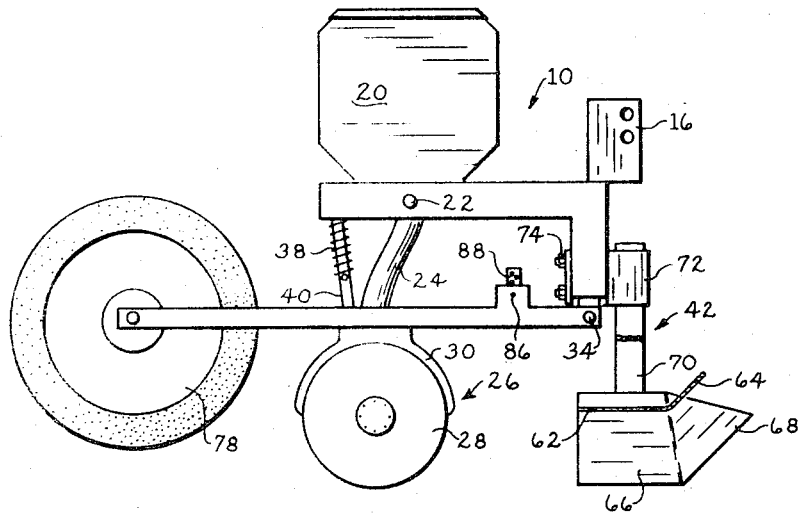
FIG. 4 is a sectional view taken substantially on line 4—4 of FIG. 3. Not only is the preplant bed shaper shown, but, also, the packer and depth gauge wheel attachment.

Preplant tillage implement 42 is attached to the bottom beam 14. Preplant tillage implement may be attached by clamps 72 (as illustrated in FIGS. 3 and 4) or by welding to the bottom beam (as indicated in FIGS. 1 and 2). However, regardless of the means of attachment, the bottom beam 14 provides a convenient means for attaching the preplant tilling equipment 42.

Referring more specifically to FIG. 1, there may be seen that legs 44 are attached as by welding to the frame 10 at the bottom beam 14. Bearings 46 at the bottom of the legs 44 form means for journaling roller shaft 48 thereto. In the embodiment illustrated in FIGS. 1 and 2, the preplant tilling implement is roller 50 attached to the roller shaft 48. The roller 50 extends approximately the length of the planter box 20. It will be understood by those skilled in the art that the frame 10 may extend for a greater width than the planter box 20 and there may be a plurality of planter boxes 20 upon the frame 10. Likewise, in case of an elongated frame so described, there may be more than one roller 50 mounted upon the frame.

Also, those skilled in the art will recognize the advantages of packing and firming up the seedbed by causing the roller 50 to be rolled over it. The roller 50 is a cylindrical metal roller. A doctor blade or scraper may be attached to ride over it to scrape soil from the surface thereof. Such arrangements are well within the knowledge of those skilled in the art.

Where the roller 50 is used as a preplant tiller, it may be used to drive the seeder shaft 22. This is accomplished by attaching roller sprocket 52 to the shaft 48 on one end thereof and, also, attaching a seeder sprocket 54 to the seeder shaft 22. Jack shaft 56 is conveniently attached to the bottom beam 14 by a bracket. A pair of sprockets on the jack shaft 56 are provided so the roller chain 58 extends from the roller sprocket 52 to the jack shaft and seeder chain 60 extends from the jack shaft to the seeder sprocket 54. Therefore, I have provided chain means drivingly extending from said roller sprocket to said seeder sprocket.

Referring specifically to FIG. 3, the preplant tillage implement 42 is in the form of a bed shaper. I.e., the soil on top of the bed is smoothed, compacted and shaped by plate 62. Plate 62 has a forward slope portion 64, which angles upward, and as this is drawn over the beds to be planted, it smooths, compacts and shapes the soil into a firm seedbed. The furrows themselves are shaped by the furrow guides 66. These furrow guides have a flat bottom portion and angled sides and wing portions with a turned up nose 68. The smoothing plates 62 are attached as by bolting or welding to the furrow guide portion 66. Inasmuch as bed shapers are well known preplant tillage implements, they will not be described furthere here. Those skilled in the art are familiar with the construction and use of bed shapers.

Each of the furrow guides 66 have upstanding shank 70 securely attached thereto. The clamp 72 interconnects the top of the shank 70 to the bottom beam 14 of the frame 10 of the drill. The clamp may be of many different forms. I have illustrated it as having bolts extending from the front to the rear and securely attached by nuts 74 to the rear of the bottom beam 14. Those skilled in the art will be familiar with other types of clamps to securely attach shanks in adjusted position to horizontal beams. The drive for the seeder shaft 22 is not shown in FIG. 3.

Figure 5:
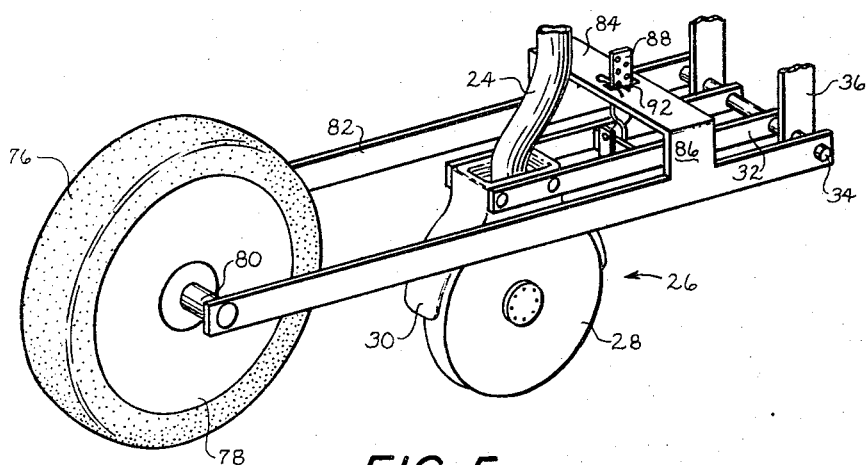
FIG. 5 is a perspective view showing the planting disc and packer gauge wheel assembly, which was shown in FIG. 4.
Figure 6:
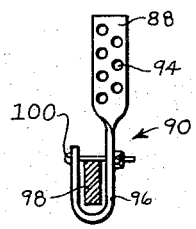
FIG. 6 is a detailed view of the J-strap used in the packer gauge wheel assembly shown in FIGS. 4 and 5.

FIGS. 4, 5, and 6, show packer wheel 78 acting as a gauge for the planter means 26. The planter means 26 has the disc 28 which opens a furrow and the boot 30 contains a mechanism therein for dropping seed into the bottom of the furrow. The tread 76 of the packer wheel 78 is several times wider than the furrow made by the disc 28. The function of packer wheels is well known, which is to push soil around the freshly planted seed and pack the soil over the top thereof. In this case, the packer wheel 78 is also used as a gauge to adjust the depth of the planter device, i.e., adjust the depth of penetration of the disc 28 into the soil. The packer wheel 78 is journaled on axle 80 which is attached to the rear of packer wheel arms 82 so the packer wheel 78 follows behind the planting assembly 26.

The packer wheel arms 82 are pivoted at their front edge about pivot bolts 34, which are the same pivots by which the planter disc arms 32 are pivoted. The two packer wheel arms 82 are connected by plate 84. This plate is extended upward by risers 86 so the plate 84 is above the arms 82 and above the planter disc arms 32. The plate 84 is horizontal and has an elongated slot extending, in the illustration, in the direction of draft therethrough. Upper portion 88 of J-strap 90 extends through the elongated slot in the plate 84. Pin or cotter 92 extends through one of a plurality of holes 94 in the top of the J-strap. The J-strap 90 gets its name from the U-shaped bend 96 in the lower portion thereof.

Referring particularly to the drawing, FIGS. 5 and 6, the J-strap 90 is twisted. I.e., the upper portion 88 lies in a plane with the direction of draft and the bottom portion lies crosswise of a direction of draft. In use, the bottom portion encompasses brace 98, which extends from one planter disc arm 32 to the other. Thus, it may be seen that the planter discs 28 are always free to ride upward, but their downward travel is limited. The planter disc brace 98 is retained within the J-strap 90 by stove bolt 100, which extends across the top of the U-shaped lower portion 96 to strengthen the strap 90. To change the depth to which the seed are planted by the planter disc 28, all that is necessary is to change the position of the cotter 92 to one of the other holes 94 within the upper portion 88 of the J-strap 90.

It is noted in FIG. 5 the rod 40 is not shown. This is to emphasize that upon the assembly with this type depth gauge, the rod 40 is not essential, but optionally can be used. If the rod 40 is omitted, the assembly is supported by a chain when elevated.

Figure 7:
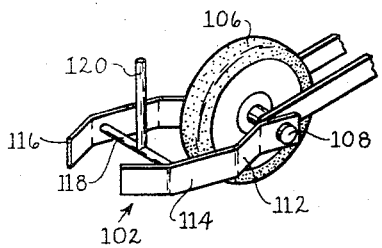
FIG. 7 is a perspective view showing a press wheel and drag assembly.
Figure 8:
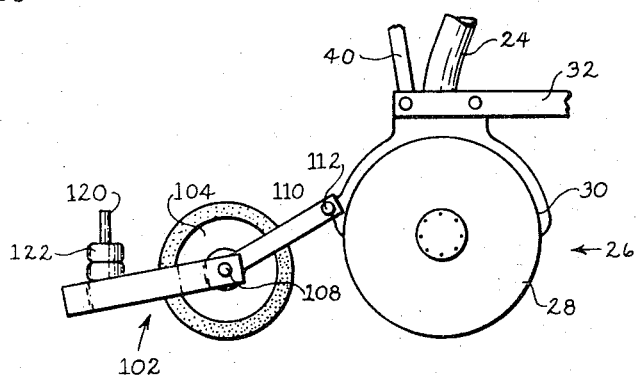
FIG. 8 is a side elevational view of the planter disc with the presser wheel drag assembly shown in FIG. 7 attached thereto, also, showing weights added to the pintle.

FIGS. 7 and 8 specifically illustrate a covering drag 102 used with a press wheel 104 behind planter disc 28. Press wheels are known to the art and they include a tread having a width about equal to the furrow formed by the planter means. In this case, tread 106 has a width about equal to the furrow formed by the disc 28. Therefore, when the seed are dropped through the chute 24 and into the furrow formed by the planter disc 28, the press wheel 104 will firmly press the seeds into the soil so they are embedded in the firm soil for better germination and sprouting. The press wheel 104 is journaled to axle 108. Press wheel arms 110 extend from the axle 108 to bolt 112 in the lower rear portion of the boot 30. As illustrated, the planter means 26 is pressed downward by mechanism including rod 40. However, this is not to say that the planter means 26 could not be used with the packer wheel 78 assembled as shown in FIGS. 4 and 5. If a packer wheel were used, the arms 82 are sufficiently long so the packer wheel 78 extended behind the drag 102.

The drag 102 includes two wings. Each of the wings has a forward portion 112 which is pivoted to the axle 108 of the press wheel 104. One of the wings is on one side and one on the other side of the press wheel. The middle portion 114 of each of the wings of the drag 102 extends parallel to one another and parallel to the direction of draft. The rear portion 116 of each of the wings angles inwardly to drag covering soil over the seed in the furrow. Connecting strut 118 extends transversely from one wing to the other. The connecting strut 118 is attached to each wing at the rear of the middle portion 114. Pintle 120 forms a convenient holder or receiver for ring-shaped weights 122. I use discarded bearing races for the weights 122. However, any weights with a hole in the center can be used to fit over the pintle 122 to provide the weight. Farmers are well accustomed to weighting tillage equipment and will understand the amount of weight necessary to be added to the pintle 120 to obtain the desired dragging-covering action of the covering drag 102. In fact, the provision is made because although two farmers might be equally skilled, one might prefer to use more weight than the other on their covering drags 102.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. In an agricultural planter having
   a. an elongated frame with elongated horizontal beams,
   b. means on the frame for moving the frame in a direction of draft,
   c. at least one seed box mounted on the frame,
   d. a plurality of planter disc units for each seed box,
   e. a chute from the seed box to each planter disc unit,
   f. each of said planter disc units forming planter means for opening a furrow and dropping seed therein, and
   g. a press wheel attached to said planter means and trailing therebehind,
   h. said press wheel having an axle,
   j. said press wheel having a tread width about equal to the furrow made by said planter means;
   k. an improved covering device comprising in combination:
   m. a rigid drag,
   n. said drag including two wings,
      i. the forward portion of each wing is pivoted to the axle at the press wheel on either side thereof,
      ii. the middle portion of each wing extends parallel to the direction of draft, and
      iii. the rear portion of each wing angles inward to drag covering soil over seed in the furrow,
   o. a connecting strut extending traversely from one wing of the drag to the other,
   p. said strut attached to each wing at the rear of the middle portion thereof,
   q. a pintle extending upward from the strut, and
   r. ring-shaped weights on said pintle.

* * * * *